United States Patent [19]

Falcoff et al.

[11] Patent Number: 5,062,298
[45] Date of Patent: Nov. 5, 1991

[54] NON-CONTACT WET OR DRY FILM THICKNESS MEASURING DEVICE USING EDDY CURRENT AND ULTRASONIC SENSORS

[75] Inventors: Allan F. Falcoff, Lake Orion; Norman M. West, Pontiac, both of Mich.

[73] Assignee: E. I. Du Pont de Nemours and Company, Wilmington, Del.

[21] Appl. No.: 446,336

[22] Filed: Dec. 5, 1989

[51] Int. Cl.[5] ................................................. G01B 7/10
[52] U.S. Cl. ........................................ 73/597; 324/229; 324/230; 324/231; 364/563
[58] Field of Search ....................... 324/229, 230, 231; 73/597; 364/563

[56] References Cited

U.S. PATENT DOCUMENTS

| | | | |
|---|---|---|---|
| 3,258,686 | 6/1966 | Selgin | 324/230 |
| 4,567,766 | 2/1986 | Seiferling | 73/597 |
| 4,614,300 | 9/1986 | Falcoff | 239/71 |
| 4,702,931 | 10/1987 | Falcoff | 427/10 |
| 4,814,703 | 3/1989 | Carr et al. | 73/597 |
| 4,912,410 | 3/1990 | Morley | 324/230 |

FOREIGN PATENT DOCUMENTS 2526937  11/1983  France ................................ 324/229

OTHER PUBLICATIONS

NASA Tech. Briefs, May/Jun. 1986, pp. 94 and 96.
Cyber Optics Bulletin—1986.

Primary Examiner—John E. Chapman
Assistant Examiner—Rose M. Finley
Attorney, Agent, or Firm—Hilmar L. Fricke

[57] ABSTRACT

A device for measuring the thickness of a wet or dry paint film applied on a substrate without contacting the film is disclosed. The device uses an ultrasonic sensor positioned adjacent to an inductive eddy-current proximity sensor where the ultrasonic sensor measures the distance between the device and the upper surface of the paint film and the proximity sensor measures the distance between the device and the upper surface of the substrate. The two distances measured, when compared, produce the film thickness value. The device is capable of accurately measuring thickness of various paint films, such as flat, glossy and metal-flake containing paint films.

6 Claims, 4 Drawing Sheets

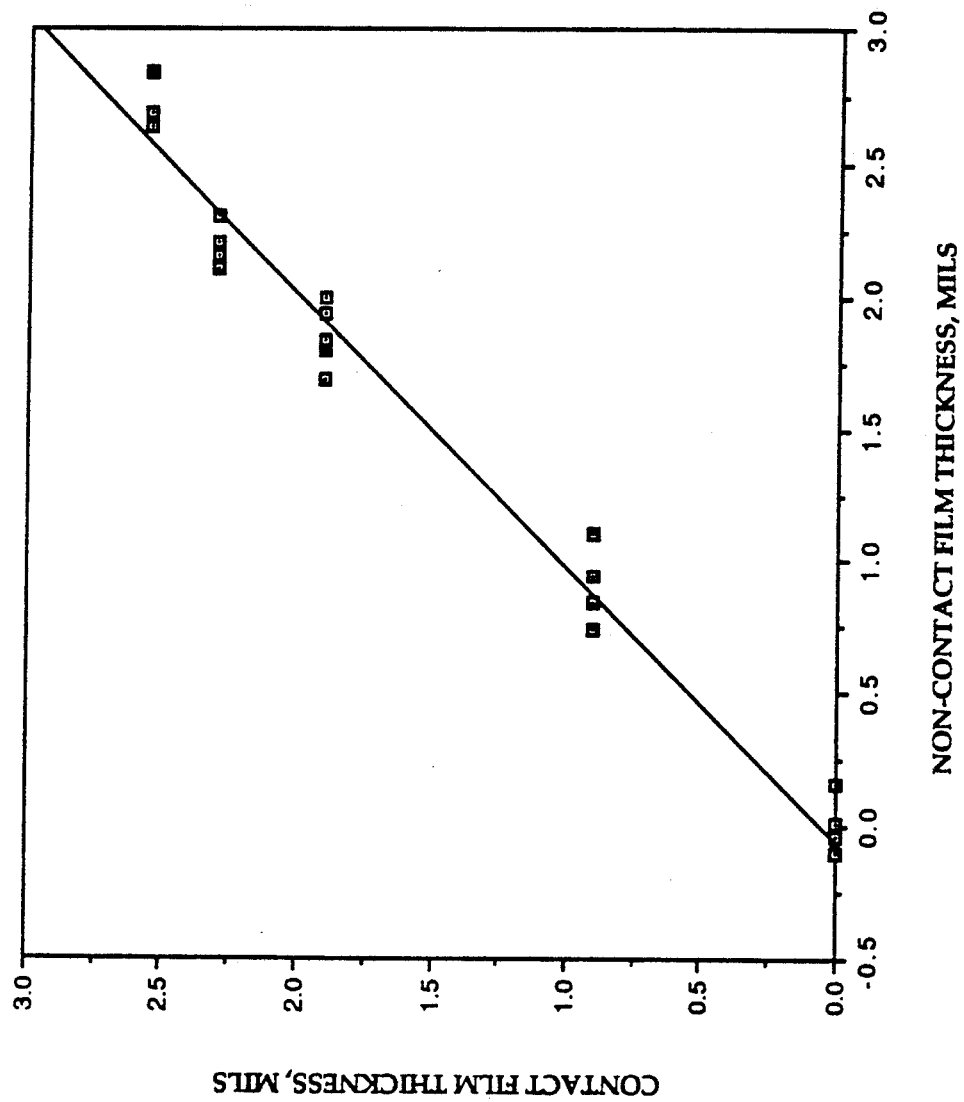

NON-CONTACT WET OR DRY FILM THICKNESS MEASURING DEVICE USING EDDY CURRENT AND ULTRASONIC SENSORS

BACKGROUND OF THE INVENTION

This invention is directed to a device for measuring the thickness of a film applied on a substrate without contacting the film itself. In particular, the device may be used in combination with a spray machine for measuring the thickness of a wet or dry paint film sprayed on a metal substrate, and which controls the thickness of the paint film to be applied to the next substrate.

In the spray application of many paints, a relatively thin film is formed near the edge of the article being coated and is substantially thicker in the center of the article. This difference in thickness of the paint film results in appearance changes from the center to the edge of the article. This is a problem in the coating of articles, such as auto or truck body panels, in which a uniform appearance is desired, and in particular is a problem for paint panels which are used as color standards in laboratories, paint manufacturing plants and automotive and truck assembly plants. In particular, rejects of paint panels to be used for color standards can be as high as 50% of the panels coated for such uses.

An example of a spray machine is shown in Falcoff, U.S. Pat. No. 4,614,300, issued Sept. 30, 1986. Many spray parameters can be and automatically controlled by this machine with the exception of the paint film thickness.

An example of an improved paint spraying device with wet film thickness measurement and feedback control is shown in Falcoff, U.S. Pat. No. 4,702,931, issued Oct. 27, 1987. However, this device has the sensors for measuring the distance from the device to the article being coated are positioned on opposite sides of the article which severely limits the use of this device in an assembly line work where series of articles to be coated are generally conveyed in succession and where it is virtually impossible to position the sensors on both sides of the article. A typical example is the painting of auto and truck doors, bodies fenders and the like.

Another device for measuring thickness of coatings on substrates is disclosed in "Measuring Thicknesses of Coatings on Metals," NASA Tech Briefs, May/June 1986, pages 94 & 96. This reference discloses the use of a triangulation optical sensing arrangement by using a helium-neon laser with an angle sensing photo-detector in a side-by-side configuration with an inductive proximity sensor. The optical sensor, as described in the reference, utilizes a beam of light normal to the surface and detects light from the surface at an angle. Accordingly, the performance of the sensor is dependent on the reflectivity and scattering properties of the film surface. Since some scattered light must be present for the optical detector to function, a perfect reflecting surface would not be measurable with this configuration. For example, a glossy surface, such as that found in automotive finishes, might be difficult to measure, particularly in bright ambient light.

In view of the above, there is a need in the art for a non-contact wet or dry film thickness measuring device which does not have the disadvantages of the conventional devices, and which preferably controls the thickness of the paint film applied on the substrates.

SUMMARY OF THE INVENTION

A device that measures the thickness of a film applied to a substrate that does not contact the film while making a measurement which contains the following:
  a. first ultrasonic sensing means for measuring a first distance value between the top surface of the film and the device;
  b. second electrical proximity sensor means for measuring a second distance value between the top surface of the substrate and the device and is positioned immediately adjacent to the first ultrasonic sensing means;
  c. the first and second sensing means are positioned on the same side of the substrate; and
  d. means that are operably associated with the first and second sensing that calculate the film thickness by comparing first and second distance values;

the device can further contain means for applying a film to the substrate and means for adjusting film thickness based on film thickness values generated by the device.

BRIEF DESCRIPTION OF THE DRAWINGS

FIG. 4 is a graphical representation of experimental data of paint film thickness measurements taken on a panel by using the device of the present invention in comparison to contact film thickness values.

DETAILED DESCRIPTION OF THE INVENTION

The principal advantage of the present invention is to provide a device that measures the thickness of a wet or dry film applied on a substrate without contacting the film which overcomes the disadvantages associated with conventional devices which, for example, require contact with the surface and cannot be used to measure the thickness of wet paint films. The device may be used in combination with a device for controlling the thickness of film. The device also has the advantage of being independent of the reflectivity and scattering properties of the film and is insensitive to the color of the film. The device measures the thickness of a wet or dry film applied on a substrate to an accuracy of 12 microns (0.5 mil) and better. Another advantage of the device is that the sensitivity of the measurement to angular orientation to the substrate surface is greatly reduced. Also, the device can be used to accurately measure the wet or dry film thickness of different types of paint films, such as glossy, flat and metal-flake containing paint films.

Figure 1:
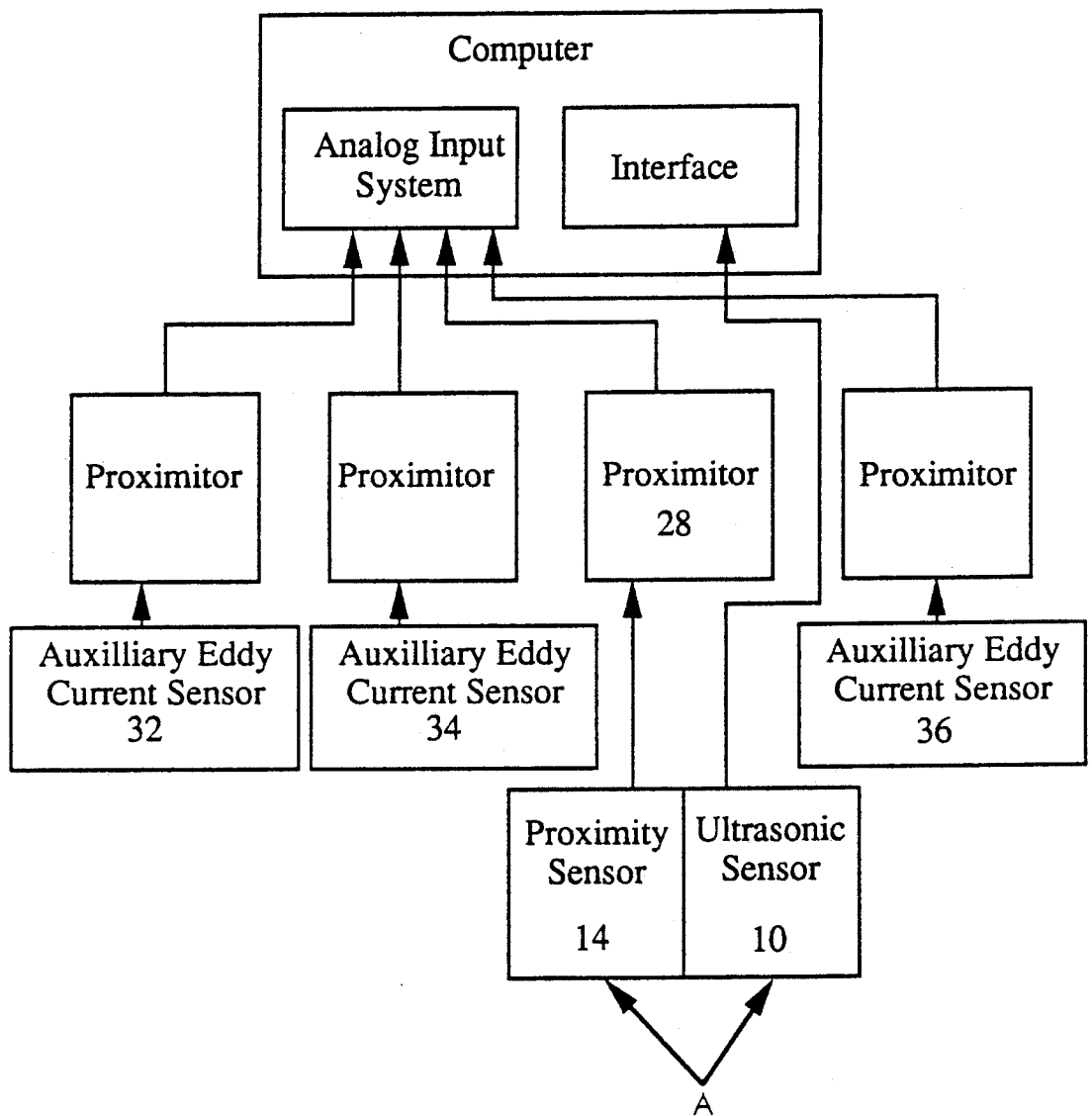
FIG. 1 is a schematic illustration of the device of the present invention, showing three auxiliary inductive eddy-current proximity sensors in phantom lines.

As schematically illustrated in FIG. 1, ultrasonic sensor 10, proximity sensor 14 and a proximitor 28, interface via conventional means, such as an analog input, with computer. Also shown in FIG. 1 are three auxiliary inductive eddy-current proximity sensors 32, 34 and 36, which may be employed in addition to the proximity sensor 14, to greatly improve the efficiency of device A, as discussed below.

Figure 2:
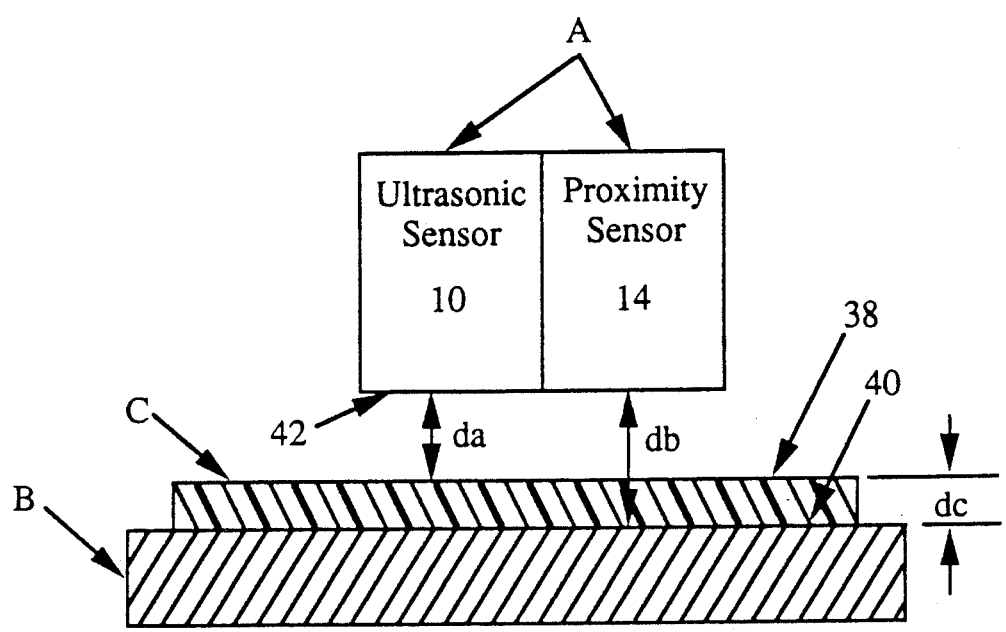
FIG. 2 is a side view, partially in section, illustrating the positions of the ultrasonic sensor and the inductive eddy-current proximity sensor in relation to the paint coated substrate.

Referring now to FIG. 2, the non-contact wet or dry film thickness measuring device generally indicated as A, includes an ultrasonic sensor 10 mounted beside the proximity sensor 14 which typically is an inductive eddy-current proximity sensor. The device A would normally be mounted on a mechanical placement device, such as a computer controlled robotic arm, to position the device relative to a substrate or article for measuring the paint film thickness. As FIG. 2 illustrates, device A has been positioned above a substrate B sprayed with a paint film C thereon. (It should be noted that only the parts necessary for an understanding of the invention are shown and described).

Figure 3:
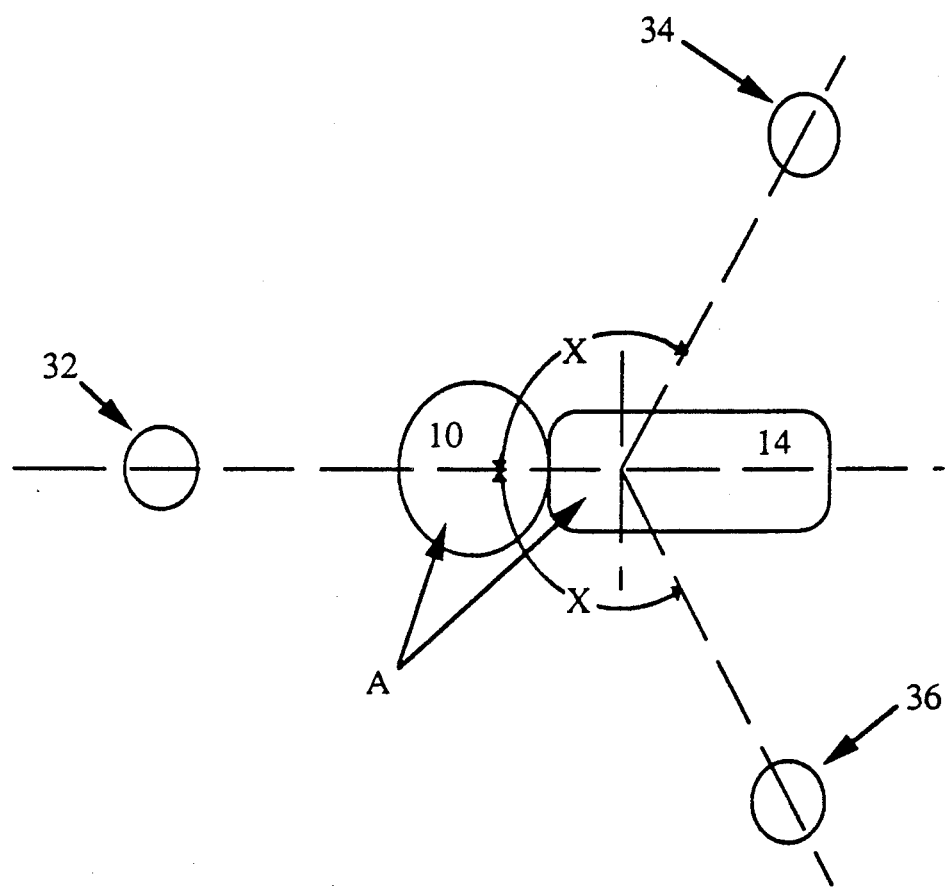
FIG. 3 shows the proximity sensor and the ultrasonic sensor without the substrate, which includes three auxiliary outboard proximity sensors.

FIG. 3 illustrates how the three auxiliary proximity sensors 32, 34 and 36 are disposed around device A. The auxiliary proximity sensors are equilaterally spaced in a circular fashion at an angular distance of about 120 degrees relative to device A, indicated by angle x in FIG. 3. The proximity sensors 32, 34 and 36, are each positioned at a preferable distance between one and two inches from central axis.

Preferably, auxiliary proximity sensors 32, 34 and 36 are each cylindrically shaped, and are available from Bently Nevada, Minden, Nev. 89423, as Model Number 21500-00-08-10-02, used with Model Number 18745-03 Proximitors and Model Number 21747-040-00 extension cables. A model DT-2814 Analog Input System available from Data Translation, Inc., Marlboro, Mass., may be used to interface the Bently sensors to an IBM PC or a compatible personal computer.

Preferably, the ultrasonic sensor is a device that generates an ultrasonic pulse and directs the pulse to the film substrate. The pulse is reflected by the surface of the film substrate and is reflected back to the transducer of the ultrasonic sensor. The time taken for the pulse to reach and to return from the surface is converted into distance. One typically useful ultrasonic sensor is Model #TMS-1000 from Ultrasonic Arrays, Woodinville, Wash. To reduce ambient temperature sensitivity, the protective shroud around the sensor should be ventilated to allow the air temperature surrounding the internal self calibrating mechanism of the sensor to be that of the external air temperature thereby reducing errors caused by a differential in temperature. An advantage of the ultrasonic sensor is that it is not dependant on optical surface characteristics of the film being measured.

The embodiment shown in FIG. 3 utilizes three auxiliary proximity sensors in a circular fashion, it would be apparent to those of ordinary skill in the art that in order to improve efficiency of the device, more than three auxiliary sensors in a different pattern, for example, rectilinear pattern, may be used to more precisely define a surface, such as a curved surface, for greatly improving the accuracy of the measurements.

Although not shown, the device of the present invention may include means for controlling the film thickness such as the thickness of a paint film as it is being applied. An example of this type of device is disclosed in Falcoff, U.S. Pat. No. 4,702,931, the entire disclosure of which is incorporated herein by reference. The film thickness control device would be in operable association with the device A of the present invention in order to vary the amount of paint to be applied to a next substrate in accordance with the paint film thickness measurement taken on a previous substrate.

In a typical operation for painting auto or truck body panels or the like, a series of articles are automatically spray painted in succession by a machine, such as a robot, to obtain a uniform paint film thickness over the surface of each of the articles. However, a number of factors cause variations in film thickness such as paint viscosity, paint flow rate, atomization pressure at the paint nozzle, various temperature gradations in the surroundings, air flow, humidity and the like. Since these factors tend to fluctuate, the film thickness may vary greatly in a given period of operation. It is critical that the paint film thickness be monitored at regular intervals. At any time, when a variation in the film thickness is detected, one or more of these factors may be adjusted in order to obtain the desired paint film thickness.

In use, the device A, in FIG. 2, of the present invention is positioned above metal substrate B with paint film C sprayed thereon. Ultrasonic sensor 10 measures a distance da from device A to top surface 38 of paint film C, and proximity sensor 14 measures a distance db from the device to upper surface 40 of metal substrate B. The measurements da and db are fed into computer (see FIG. 1) and compared to determine the paint film thickness dc. The above can be illustrated as follows:

da = distance from device A to paint film surface 38
db = distance from device A to substrate surface 40
Thickness of paint film dc = db − da.

It would be apparent to those of ordinary skill in the art that it is critical that lower surface 42 of proximity sensor 14 be kept parallel to film surface 38, as any slight variation would produce an inaccurate reading. In order to eliminate any misalignment or to mathematically overcome the angular error, the second embodiment shown in FIG. 3 may be used. In this embodiment, the auxiliary proximity sensors 32, 34 and 36, are positioned parallel to the plane of lower surface 42 of sensors 14 and 10. In particular, any angular mis-alignment of surface 42 to surface 38 may be either physically or mathematically corrected by measuring the distance to surface 38 from each of the three auxiliary sensors 32, 34 and 36, computing the angular error, and then correcting the angular position in accordance therewith. If the distance at sensor 14 lies along the calculated plane defined by the distances of sensors 32, 34, and 36, then the substrate is flat. If the distance is different then the surface is curved and is handled as described below.

The alternate embodiment using one proximity sensor 14 and three auxiliary proximity sensors 32, 34 and 36, also permits accurate measurements without the sensors being exactly normal to the surface on curved surfaces, as frequently is found on automobile body panels. As shown in FIGS. 2 and 3, by placing device A above the curved surface of a substrate, the three auxiliary proximity sensors 32, 34 and 36 measure any angular alignment of surface 42 relative to surface 38 of film C, as described above. The proximity sensor 14 then makes a distance measurement from the device to the upper surface of the substrate and compares it with the measurements taken by auxiliary proximity sensors 32, 34 and 36 to calculate the radius of curvature of the surface in three directions. The theoretical tangent plane at the center point of the sensors may then be calculated and film build calculated at the normal point.

The device of the present invention was used to measure paint film thickness of test panels with five different film builds nominally 0, 1.0, 2.0, 2.25 and 2.5 mils respectively and compared to conventional readings using a Fischer Permascope making contact with the surface. The results obtained are provided below in Table I, and the measured data is graphically shown in FIG. 4.

TABLE I

| FISCHER PERMASCOPE | NON-CONTACT DEVICE OF INVENTION |
| --- | --- |
| 0.00 | 0.16 |
| 0.00 | −0.04 |
| 0.00 | −0.10 |
| 0.00 | 0.01 |
| 0.00 | −0.10 |
| 0.90 | 0.84 |
| 0.90 | 0.94 |
| 0.90 | 0.74 |
| 0.90 | 0.94 |
| 0.90 | 1.10 |
| 1.90 | 1.84 |
| 1.90 | 1.80 |
| 1.90 | 2.00 |
| 1.90 | 1.94 |
| 1.90 | 1.69 |
| 2.30 | 2.21 |
| 2.30 | 2.16 |
| 2.30 | 2.31 |
| 2.30 | 2.21 |
| 2.30 | 2.11 |
| 2.55 | 2.84 |
| 2.55 | 2.68 |
| 2.55 | 2.69 |
| 2.55 | 2.64 |
| 2.55 | 2.64 |

The measurements made by the device of this invention are considered to be within experimental error of those measurement made by the contact measurements of a conventional instrument.

While this invention has been described as having a preferred design, it is understood that it is capable of further modifications, uses and/or adaptations of the invention following in general the principle of the invention and including such departures from the present disclosure as may come within known or customary practice in the art to which the invention pertains, and as may be applied to the essential features set forth, and fall within the scope of the invention or the limits of the appended claims.

What is claimed is:

1. A device for measuring the thickness of a film applied on a substrate without contacting the film, comprising;
   a) first ultrasonic sensor means for measuring a first distance value between the top surface of the film and the device; wherein the ultrasonic sensor means comprises an ultrasonic pulse generator which generates an ultrasonic pulse which is directed to the film surface and a transducer which receives the pulse after it is reflected back from the film surface;
   b) second electrical proximity sensor means immediately adjacent with said first means for measuring a second distance value between the top surface of the substrate and the device; wherein the electrical proximity sensor means comprises an inductive eddy-current proximity sensor means;
   c) said first and second means disposed on the same side of the substrate;
   d) means operably associated with said first and second means for calculating the film thickness by comparing said first and second distance values;
   e) auxiliary sensor means comprising inductive eddy-current sensors means spaced from said second electrical proximity sensor means for measuring a third distance value between the top surface of the substrate and the device;
   f) said first ultrasonic sensor means, said second electrical proximity sensor means and said auxiliary sensor means all disposed on the same side of the substrate; and
   g) means being operably associated with said first ultrasonic sensor means, said second electrical proximity sensor means and said auxiliary sensor proximity sensor means and said auxiliary sensor means for calculating the film thickness by comparing said first, second, and third distance values.

2. The device of claim 1 wherein the means for calculating film thickness operably associated with the first ultrasonic sensor means, the second electrical proximity sensor means and the auxiliary sensor means comprises a computer with an interface and an analog input system.

3. The device of claim 2 in which three auxiliary sensor means are space equidistant and at equal angles from the second electrical proximity sensor means.

4. A device for measuring the thickness of a wet paint film applied to a substrate without contacting the film, comprising;
   a) a first ultrasonic sensor means for measuring a first distance value between the top surface of the pain and the device; wherein the ultrasonic means comprises an ultrasonic pulse generator which generates an ultrasonic pulse which is directed to the film surface and a transducer which receives the pulse after it is reflected back from the film surface;
   b) second electrical proximity sensor means comprising an eddy-current sensor immediately adjacent to the first ultrasonic sensor means for measuring a second distance value between the top surface of the substrate and the device;
   c) auxiliary sensor means comprising inductive eddy-current sensors spaced from said second electrical proximity sensor means for measuring a third distance value between the top surface of the substrate and the device;
   d) said first ultrasonic sensor means, second electrical proximity sensor means and auxiliary sensor means disposed on the same side of the substrate; and
   e) means operably associated with said first ultrasonic sensor means, second electrical proximity sensor means and auxiliary sensor means for calculating the film thickness by comparing said first, second and third distance values; wherein the means operably associated with said first ultrasonic sensor means, second electrical proximity sensor means and the auxiliary sensor means comprises a computer with an interface and an analog input system.

5. The device of claim 4 wherein three of said auxiliary sensor means are disposed round said second electrical proximity sensor means in a circular pattern and are equilaterally spaced by an angular distance of about 120°.

6. The device of claim 5 in which the substrate to which the paint film is applied is metal.

* * * * *